Sept. 26, 1967 G. C. DE WITZ ETAL 3,344,215
PRODUCTION OF EXPANDED THERMOPLASTIC PRODUCT
Filed Oct. 1, 1963
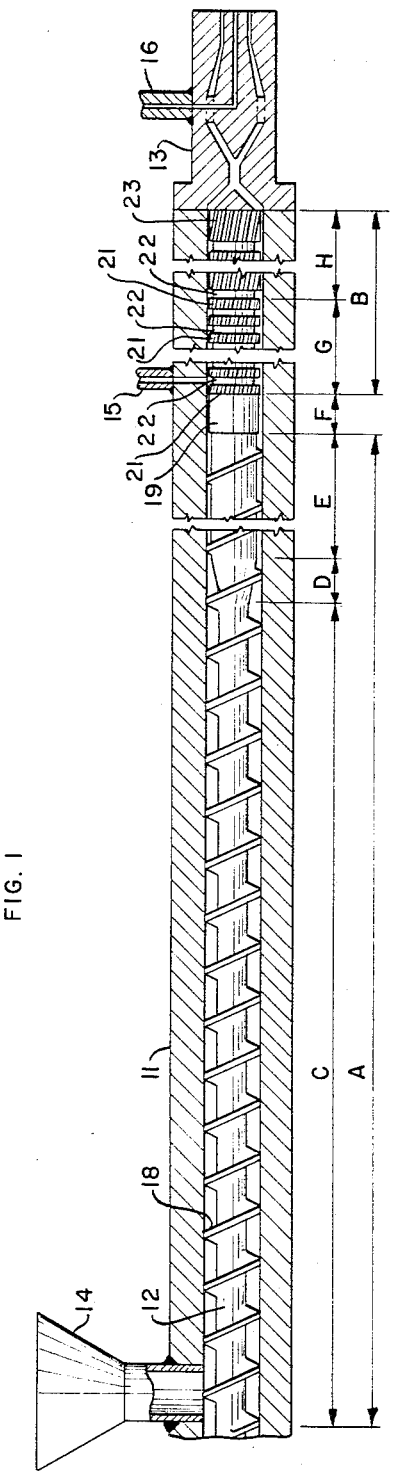
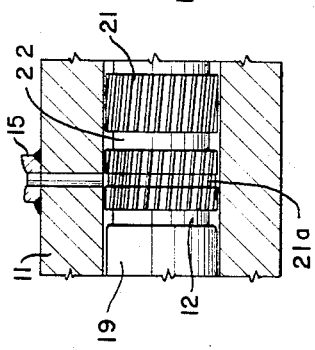
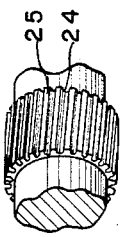
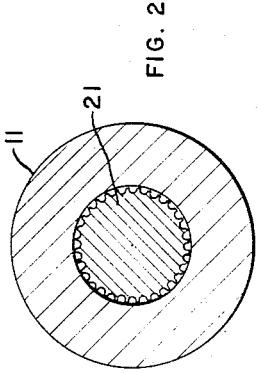
INVENTORS:
JAN DEKKER
GERALD C. DE WITZ
BY: *Martin S. Baer*
THEIR ATTORNEY 3,344,215
PRODUCTION OF EXPANDED THERMOPLASTIC PRODUCT
Gerald C. De Witz, Blackwood, N.J., and Jan Dekker, Delft, Netherlands, assignors to Shell Oil Company, New York, N.Y., a corporation of Delaware
Filed Oct. 1, 1963, Ser. No. 317,099
Claims priority, application Netherlands, Aug. 22, 1963, 296,971
12 Claims. (Cl. 264—53)

This invention relates to the production of thermoplastic articles by extrusion. More specifically it relates to an improved method for producing expanded polystyrene in sheet or film form by blow extrusion.

The invention is particularly adapted for the production of polystyrene products by blown film extrusion and will be described in connection therewith. It may also be applied, however, in the production of extruded products other than by the blown film method, and in the production of extruded products from modified polystyrene and from thermoplastic polymers similar to polystyrene in their properties.

Expanded or foamed polystyrene products are well known. Methods have been described for producing expanded polystyrene products by direct extrusion.

Blow extrusion, in the preferred mode of practicing this invention, is a technique heretofore employed for the conversion of polystyrene and other polymers to film or sheet. This technique is summarized, for example, in "Extrusion of Plastics" by E. G. Fisher, Interscience Publishers, Inc., New York, 1958, Chapter 7, section 7.3.4. Both non-cellular and foamed sheet or film can be produced by blow extrusion.

In blow extrusion, polymer is charged to a plastics extruder wherein it is melted and extruded in the form of a thin walled tube through a die provided with an annular orifice. The tube is closed by pinching or collapsing rolls at a sufficient distance from the die for the film to have cooled to a temperature at which it is dimensionally stable. The collapsed tube passes through takeoff rolls. Air is blown into the tube through the mandrel of the die to stretch the polymer film in a lateral direction while it may be at the same time stretched in a longitudinal direction by operating the takeoff rolls at a speed which is greater than the linear speed at which the tube issues from the die of the extruder. In this operation, the tube diameter is increased and wall thickness decreased. Depending on the nature of the material to be extruded and also on the rate of film production desired, the tubular film may be subjected to forced cooling, such as by appropriately directed air stream or may be cooled merely by action of the ambient air. The flattened polymer tube may be slit and trimmed before take-up to desired dimensions.

Heretofore, extruded cellular polystyrene film or sheet has generally been produced by extrusion of expandable polystyrene particles. These are beads, nibs or pellets which contain dissolved in the polymer an expanding agent, typically a low boiling, normally liquid substance such as pentane. Upon heating or extrusion into a zone of lower pressure while heated, the expanding agent vaporizes and expands the softened polystyrene particles but tends to produce foam which has undesirably large cells, i.e., larger than 1.0 mm., of non-uniform size. This problem has been overcome by combining expandable polystyrene particles prior to extrusion with "cell size control agents," commonly referred to as "foam nucleating agents." These two terms, as used herein, mean the same thing.

The production of foamed polystyrene film or sheet by the blow extrusion of an expandable polystyrene starting material admixed with a foam nucleating system, as known heretofore, has several disadvantages. It lacks flexibility, in that the content of foaming agent in the polymer cannot be varied at will, but is limited by the available feed. It is relatively expensive, for several reasons: It requires two separate processing stages, namely, manufacture of expandable polystyrene and conversion of expandable polystyrene particles to film in a blow extrusion process. There is a gradual loss of valuable expanding agent since the expanding agent usually has an appreciable vapor pressure when associated with the beads. The gradual evaporation of hydrocarbon expanding agent also results in a hazardous condition and in gradual change in the properties of the expanded product. Feeding expandable beads to an extruder is attended with a sufficient number of practical difficulties so that it has been proposed to add the additional processing step of converting expandable beads in a separate extrusion step to the form of expandable nibs. This adds a separate processing sequence and additional expense. In spite of the expense and associated problems, production of foamed polystyrene film from expandable or pre-expanded particles has been used because it permits production of useful product by means of conventional extruders.

It is known that foamable polystyrene particles can be produced by so-called "direct gassing" in which plain polystyrene particles and an expanding agent such as pentane are separately charged to an extruder. In attempts to utilize direct gassing in a conventional single-screw extruder for the continuous production of foamed sheet or film, difficulties were experienced in producing foamed product of consistent good quality.

The principal objects of this invention are to provide an integral method for converting polystyrene or similar resin directly and economically to foamed film or sheet of uniformly high quality in a one-step blow extrusion operation, and to provide an improved apparatus for practicing said method.

A further object is to provide a flexible method for converting polystyrene or similar resin to foamed film or sheet of selected controlled density in a one-step blow extrusion operation utilizing a single-screw extruder of improved design.

A specific object is to provide an improved method for incorporating a volatile liquid foaming agent into a plastic mass, and an improved apparatus therefor.

These and other objects of the invention will be better understood from the following description.

In a preferred embodiment, film or sheet of expanded polystyrene is produced by a process which comprises feeding polystyrene and a foam nucleating agent into the feed section of a single-screw extruder provided with a barrel or cylinder through which the polymer is conveyed by a rotating screw in the direction of an extrusion die; the mass is heated and plastified in a first zone of the extruder, in which the pressure of the plastified mass is increased to a value at least sufficient to overcome the pressure drop in the remainder of the extruder and the die; the plastified mass is passed to the second zone of the extruder, in which a volatile, liquid foaming agent is continually introduced into the plastic mass; the resulting mixture is intensively mixed in said second zone to produce a substantially homogeneous distribution of foaming agent in the plastic, and is then cooled; the cooled but still plastic mixture is extruded through an annular die slit, resulting in a tubular film of expanded polystyrene which is blown to a desired diameter, cooled, collapsed and recovered as expanded film or sheet.

The extrusion process of this invention is especially designed for the production of blown, expanded polystyrene film and sheet. The essential limitations of the process for the production of such product are the following:
(1) The ingredients employed are a polystyrene composition, a foam nucleating agent or system, and a volatile, liquid foaming agent. (2) The extrusion is carried out in a single-screw extruder having an $L/D$ ratio in the range from 20 to 36. (3) The extruder is divided into a single feed plastifying and compression and metering zone followed by a single mixing and cooling zone. In the former zone, polymer and nucleating agent are converted to a steadily flowing plasticized fluid at a temperature between 150° and 300° C. and a pressure of at least about 1,500 p.s.i.; in the latter zone, liquid foaming agent is continually injected into the plastified mixture and intimately distributed therein and the mixture is cooled before it passes to the extrusion die. (4) There is no pressure increase of the plastic mass after liquid foaming agent has been injected into it. (5) There is no flow rate regulation of the plastic mass, such as produced in a metering zone, after liquid foaming agent has been injected. (6) The plastic mass is cooled below about 160° C. before it is extruded.

Another embodiment of this invention is a single screw extruder adapted for the practice of the process of this invention. Said extruder is characterized by the following: It has an $L/D$ ratio in the range from 20 to 36. It is divided into two zones; the first zone comprises feed plastifying, compressing and metering portions; the second is a mixing and cooling zone. The feed plastifying, compressing and metering portions are defined by suitable configurations of the screw and include heat exchange means adapted to heat the plastic mass therein. Said second zone contains at the start thereof liquid injection means adapted to inject liquid foaming agent into a plastic mass. The torpedo in at least the first part of said second zone contains mixing elements consisting of relatively short grooved cylindrical disks alternating with annular flow sections, as hereinafter described in greater detail. The first part of the second zone contains heat exchange means adapted to provide moderate heating or moderate cooling of the plastic; the final part of the second zone contains heat exchange means adapted to provide substantial cooling of the plastic. Suitably, several separate cooling means are employed in the cooling zone to permit cooling at controlled varying rates. The torpedo in the final part of said second zone may be of the same configuration as in the mixing section, or it may contain non-metering conventional mixing elements. Connected to the outlet of the second zone of the extruder is an extrusion die, such as a pipe die or blown film die. An optional feature is a sealing restriction placed between the metering section and the mixing section.

Other novel and improved aspects of the process and apparatus according to this invention will be described. The limits of the invention are defined in the claims.

The invention will be illustrated by means of the drawing wherein:

FIG. 1 is a simplified representation of a longitudinal cross section of an extruder and die head suitable for use in the process;

FIG. 2 is a simplified cross section of the extruder along line X—X of FIG. 1, illustrating the section of a mixing element;

FIG. 3 is a simplified representation of a longitudnal cross secton of part of the mixing zone of an extruder;

FIG. 4 is a view of a mixing element of the extruder torpedo, in elevation; and

FIG. 5 is a view of a different mixing element of the extruder torpedo, in elevation.

The extruder is represented schematically in the drawing in order to simplify description of the invention. Not shown are such well known features as the design and location of heat exchange means; separation of the body of the extruder into segments and components; separation of the body of the extruder into segments and components; separation of the screw and torpedo into segments which are assembled into one unit by means of screw threads; arrangement of the screw bearing and prime mover; and the like. Such details of extruders are shown, for example, in Chapter 4 of "Processing of Thermoplastic Materials" by Bernhardt, Reinhold Publishing Corp., N.Y., 1959; in "Modern Plastics Encyclopedia, 1963," pages 744–46 and references cited there; and in many patents and publications.

The illustrated apparatus consists of extruder body 11, extruder screw 12, the front part of which is a mixing torpedo, extrusion die 13, feed hopper 14, inlet line 15 for liquid foaming agent, and air inlet line 16.

The extruder illustrated in FIG. 1 is divided into zone A, the feed, pumping and metering zone, and zone B, the mixing and cooling zone.

In zone A, one or more heat exchange means are provided, such as heating bands or heat exchange jackets surrounding the cylinder barrel. The screw in zone A is divided into three sections, designated, respectivey, feed section C, compression or transition section D, and metering section E. In all of zone A, the screw is provided with a helicoidal flight 18.

Feed section C of the screw has a relatively small root diameter, and consequently a large channel depth. The screw root diameter increases in transition section D, and is constant and relatively large in metering section E. The illustrated screw arrangement of zone A is well known in screw extruders for plastics.

Section F, which is optional, is a sealing restriction in the form of a so-called "blister" 19; this provides a resistance zone of further reduced channel depth, which assists in preventing backflow of foaming agent into zone A. The blister is not flighted.

In mixing and cooling zone B at least two separate heat exchange means are provided, such as heat exchange jackets surrounding the cylinder barrel, to permit maintaining the plastic mass in the first part thereof, shown as G, at a relatively high temperature and to cool it in the last part, shown as H, to a desired substantially lower value.

At the beginning of mixing zone B, means are provided for injecting liquid foaming agent into the plastic mass. The mixing section of the torpedo is designed for providing mixing of the two fluids. This important feature of this invention will be described in greater detail hereafter. Briefly, at least the first part of the torpedo, preferably as much as lies in part G of the mixing zone, is provided with mixing elements which consist of alternating grooved cylindrical disks or collars 21 and short annular flow sections 22. In part H, of zone B heat exchange means suitable for cooling are provided. These may consist of a single jacket surrounding the barrel, or may be several separately controllable heat exchange means along the barrel, to permit control of the rate of cooling. Means are also provided for heating part H, if required, during startup of the process. The section of the torpedo which lies in cooled part H may have the same arrangement of mixing elements and flow sections as the section in part G; alternatively, as illustrated, it contains longer mixing elements 23. These may be conventional so-called Dulmage stages, or may be similar in design to mixing elements 21 except for greater length.

A conventional screen pack may be placed between the extruder barrel and the die. This is not shown in the drawing; it is not required in the preferred mode of practicing the invention.

In the production of blown film, according to this invention, a conventional pipe die or blown film die may be utilized. As illustrated, die 13 has an annular orifice and is provided with an air passage 16 arranged in the mandrel of the die to permit a desired air pressure to be maintained within the extruded tube.

The slit width of the orifice of the die is suitably in the range from 0.25 to 4.0 mm., and preferably between 0.5 and 2.0 mm. A die with adjustable slit width can be employed.

The apparatus for collapsing, slitting and film takeup may be of conventional type, and is not illustrated.

For the practice of the process of this invention, the extruder illustrated in the drawing may be modified, provided the limitations which are essential to successful practice of this invention are observed.

In the operation of the process of this invention as illustrated in FIG. 1 of the drawing, an intimate mixture of polystyrene particles and a suitable foam nucleating agent is introduced into the extruder.

As a result of the rotation of screw 18, the mixture is continuously conveyed through the extruder barrel in the direction of the die. In the part of zone A which coincides with section C, the mixture is melted by means of heat supplied through the barrel wall from external heating means together with frictional heat developed in the mixture. Steady, metered flow of the plastified mixture is secured in metering section E, in which both screw root diameter and pitch of the screw flight are constant. The plastified mass is moved through the narrow channel between blister 19 and the barrel wall and enters the mixing zone. Liquid foaming agent is injected into the plastified mixture at the beginning of the mixing zone. As illustrated in FIG. 1, the liquid injection orifice is arranged to inject the liquid into an annular flow section which is preceded by a single mixing element. Alternative arrangements are possible, for example, as illustrated in FIG. 4 and discussed below. The force which moves the plastified mass through the mixing and cooling zone and through the die is the pressure drop between the sealing restriction and the die. The extremely uniform mixture of plastic and blowing agent which is essential for successful production of foamed film is provided in a relatively short mixing section by a special arrangement of mixing elements, as illustrated in the drawing and as discussed in further detail below.

Cooling of the mixture of plastic and foaming agent is provided by suitable heating exchange means in the last part of zone B, which coincides, as illustrated, with section H. This section contains further mixing elements. Their purpose is mainly to provide intimate heat exchange between the mixture and the barrel wall; this purpose is well served by conventional mixing elements, such as Dulmage stages.

The length of an extruder is usually expressed in relation to the inner diameter of the extruder cylinder. Thus, a 20 $L/D$ extruder is one in which the length of the extruder, calculated from the hopper to the beginning of the die, is twenty times the diameter of the cylinder. In conventional, commercially obtainable extruders, the $L/D$ ratio is restricted to a maximum of about 36 because the torsion forces which occur during extrusion become excessive at higher $L/D$ ratios. Special and often very expensive provisions are required to overcome the high torsion forces in extruders with higher $L/D$ ratios, such as 40 or 50. The process and apparatus of this invention are particularly designed to permit successful operation in commercially available single-screw extruders of $L/D$ ratios between 20 and 36; extruders having an $L/D$ ratio of at least 24, and particularly about 28 to 32, are preferred.

The plastifying, transition and metering sections of the extruder screw are conventional; the design requirements for these sections are well known. A typical useful design is illustrated in the drawing. In this design, the feed or plastifying section is about 15 diameters in length; the screw has a constant pitch, the lead being 1 diameter. The transition section is about 1 diameter in length. In it, the screw root diameter increases from about ⅔ of the barrel diameter to about 0.9 barrel diameter, providing a so-called compression ratio of about 3:1. The metering section is about 5 diameters in length, with constant screw diameter and pitch. Many modifications may be made in the design of these sections of the screw without departing from this invention. The length of the combined plastifying, pumping and metering section may be greater or less than illustrated, provided sufficient heating and pumping action are available to plastify the feed and move it into the mixing zone at the desired pressure and state of plastification. The length of the combined screw sections in zone A is generally between 10 D. and 25 D. The lengths of the component sections may be accordingly varied, as may be the length relationship between the three sections. For example, feed section C may vary from 1 D. to 20 D.; transistion section D from 1 D. to 20 D.; and metering section E from 4 D. to 10 D. Any flighted section of the screw may have varying pitch.

In the apparatus illustrated in the drawing, the mixing zone and the provisions for introducing liquid foaming agent into the plastified mass and distributing it therein are not conventional.

The liquid foaming agent is continually injected into the extruder through one or more orifices in the cylinder wall. The foaming agent is conducted to the orifices from a reservoir through lines and pumps which are not shown. No special injection nozzles are required; openings flush with the cylinder wall are sufficient. A single opening of 0.008 cylinder diameter was found suitable, for example. Although injection in a radial direction through a single simple opening in the cylinder wall is entirely satisfactory and is generally preferred, injection may also be accomplished through orifices or nozzles which inject liquid tangentially or axially, and it may be accomplished through multiple orifices or nozzles. When several orifices are desired, they may be advantageously arranged symmetrically around the circumference of the cylinder. Alternatively, several liquid supply orifices may be positioned along the longitudinal direction of the mixing section. Simultaneous injection through such axially spaced multiple orifices results in gradual increase in foaming-agent content of the plastic mass. It is preferred, however, to introduce all the foaming agent at the beginning of the mixing zone.

It has not been found necessary for successful operation of the process of this invention to provide special means in the orifice for preventing plasticized mass from entering the liquid injection orifice while the extruder is in operation. This may be due to the fact that flow of liquid foaming agent is substantially continuous in the process of this invention, and the plastic mass is at a relatively high temperature and hence is not excessively viscous. If desired, a simple device, such as a needle valve or plug, may be employed to close the orifice when the extruder is shut down or in the event of failure of the foaming agent pump.

Since the liquid foaming agent is injected into the plastic mass substantially continuously it is important to provide for continuously sweeping it away from the injection orifice and for uniform distribution of small portions of the liquid foaming agent in portions of the flowing plastic mass. If relatively large portions of foaming agent were permitted to aggregate in the extruder it would become impossible to achieve the uniform dispersion which is essential to production of foamed film of uniform quality. It has been found that the necessary mixing action for achieving the desired uniform dispersion is obtained in a mixing zone of modest length in which the torpedo contains a number of grooved mixing elements 21, separated from each other by annular flow sections 22. In the apparatus of this invention the torpedo in at least the first part of the mixing zone contains such alternating mixing elements and annular flow sections.

A typical mixing element is illustrated in section in FIG. 2 and in elevation in FIG. 5. It consists of a cylindrical disk having an external diameter which is smaller than the bore of the extruder barrel diameter by only enough to provide for clearance without permitting substantial axial flow of plastic except through the grooves of the mixing element. The clearance is suitably between 0.05 and 0.25 mm.; it is typically 0.1 mm. The length of each mixing element is in the range from 0.03 D. to 0.8 D., but is preferably about 0.1 to 0.2 D. The channel depth of each groove of the mixing element is suitably from half to twice the channel depth of the metering section, and is preferably the same. The grooves of the mixing element may have any desired shape; e.g., they may be sections of a circle, parabola, rectangle or square. The ratio of the width of the lands 25 between grooves 24 to the width of the arcs subtended by the grooves at the circumference of the disk, in section, is suitably in the range from 0.01:1 to 1:1, and preferably between about 0.1:1 and 0.4:1. The grooves of the mixing elements may be aligned with the axis of the torpedo, or they may be angled as much as 60° with respect to the axis of the torpedo. For example, forwarding pitch angles of 30° and 60°, and reversing pitch angles of 30° have been successfully used in the process of the invention.

FIG. 5, illustrating in elevation a typical mixing element of this invention 21, show the appearance of grooves 34 and the lands 25 between the grooves. Unlike the grooves of Dulmage mixing elements, the grooves as shown are of constant width; the crowns of the mixing elements are not tapered, but are of constant diameter. The number of grooves can vary. It is defined by the above-stated ratios between width of lands and grooves.

The annular flow sections which alternate with the mixing elements suitable have the same channel depth as the grooves of the mixing elements. Their length is suitably between 0.03 and 0.3 D. and preferably is about 0.1 D. Generally the length of annular sections between mixing elements is from 0.5 to 2 times that of the adjoining elements.

The total length of mixing and cooling zone B is in the range from 5 to 15 diameters.

Two major considerations enter into the arrangement and operation of heat exchange means in zone B. The first part of zone B, shown as part G, which is adapted to provide heating or mild cooling of the plastic should be long enough that a substantially homogeneous mixture of liquid foaming agent in the plastic is formed therein. For this reason, the length of part G is affected by the efficiency of the mixing action of the torpedo. The part of zone B in which substantial cooling of the plastic mass occurs, shown as part H, must be long enough that the mixture can be cooled therein to the desired relatively low exit temperature. Its length, therefore, is a function of the efficiency of the cooling means; this is affected, for example, by temperature of cooling fluid, configuration and heat transfer characteristics of the heat exchange surfaces, heat transfer properties of the plastic mass, and the like.

There is a sound reason why it is important to achieve an intimate admixture of liquid foaming agent and plastic in zone G before it is exposed to substantial cooling in zone H. An intimate dispersion of hydrocarbon, halohydrocarbon or perhalocarbon in plastic such as polystyrene has a much lower viscosity at a given temperature than the plastic alone, and has a correspondingly lower solidification temperature. Hence, if one were to substantially cool a coarse mixture of plastic and foaming agent in which there exist some sections of pure plastic and others having various concentrations of foaming agent intimately admixed with plastic, the result would be that small parts of non-uniform compositions, particularly those with little or no foaming agent, could be cooled sufficiently to give them a relatively much higher viscosity than the remaining mixture; these cooled portions would tend to remain unmixed, and the extruded mass would consequently not be of uniform composition.

It has been found useful to provide a mixing zone G of 3 to 10 diameters in length and a cooling zone H of 5 to 12 diameters in length. Zone G is suitably maintained at a temperature which is the same as or from 10° to 40° C. lower than that of the plastic mass which enters it. This may be accomplished by not compensating for natural heat losses. Zone G may also be heated somewhat or cooled somewhat, keeping in mind the necessity of avoiding cooling any part of the mixture to about its solidification temperature.

It has also been stated that the cooling means in zone H may be adapted to provide varying rates of cooling in different parts of zone H.

From the above explanation it will be understood that the cooling means in zone B are suitably controlled to produce in the plastic flowing in zone B a temperature profile in which the temperature at each point is not so low that any parts of the mixture is cooled to its solidification temperature; the actual temperatures which are desirably maintained during the process of this invention are disclosed below.

To achieve the necessary mixing action in zone B, the mixing section of the torpedo should contain at least four and preferably from 8 to 20 mixing elements 21, separated by annular flow sections 22. Not all elements and flow sections need be of identical length and configuration.

The mixing elements in cooling zone H may be conventional Dulmage stages, which may be up to 1.5 D. in length, or may be elements similar to the described grooved elements, but 0.03 to 1.5 D. in length, alternating with annular flow sections of 0.03 to 0.3 D. in length.

In the arrangement of the mixing zone illustrated in FIG. 1, liquid foaming agent is injected into a narrow annular flow section preceded by a single grooved mixing element, which may be somewhat wider than the remaining grooved elements, e.g., 0.2 D. when the others are 0.1 D.

In a particularly preferred arrangement illustrated in FIG. 3, the injection orifice for liquid foaming agent is located such that the liquid is directly injected into the grooves of the first grooved mixing element. The mixing element into which fluid is injected is preferably a modified element 21a, shown in detail in FIG. 4. In this modified element the portion of the crown which rotates immediately opposite the inlet orifice is shaved down, suitably by no more than one half of the groove depth. This prevents plastic being forced into the orifice as the element turns. A typical element such as 21a, adapted for use in an extruder of 60 mm. bore, is 10 mm. long, has grooves 3 mm. deep, a relief 1½ mm. wide and 1 mm. deep, a land width about 0.4 times the groove width, and a radial clearance of 0.1 mm.

The arrangement of FIG. 3 leads to exceptionally good distribution of foaming agent in the plastic mass since it assures immediate gross distribution of portions of foaming agent in discrete portions of plastic in each groove as the torpedo turns.

Liquid foaming agent is preferably pumped by means of multiple positive displacement pumps arranged to provide continual, i.e., substantially continuous flow, and adapted to controllably deliver varying volumes of liquid either by adjustment in pump displacement or by adjustment in pump speed. Variations in the ratio of liquid foaming agent to plastic permit controlled variation in the density of foam product.

In a particularly advantageous arrangement of the pumps which supply liquid foaming agent to the extruder, these pumps are connected with the extruder screw by a suitable mechanical, hydraulic or electrical linkage in such fashion that changes in rate of turning the extruder screw cause proportionate changes in pumping rate of foaming agent. This results in approximately constant proportioning of flowing plastic and of foaming agent and facilitates changes in rate of plastic flow such as during process startup. By careful pump design, the described coupling of pump and screw can result in precise proportioning throughout a desired range of flow rates.

In an advantageous modification of the process, a feed containing from 25 to 100% of expandable polystyrene particles, the remainder being ungassed polystyrene particles, is charged during startup. This modification has been found to result in reduction of startup time to as little as one fourth of that required when only ungassed polystyrene is charged from the start. The content of expandable polystyrene is proportioned to produce foamed polystyrene at extruder temperatures no higher than required during steady-state operation of the process.

In a study of the production of foamed polystyrene film or sheet by blow extrusion it has been found that a particularly important requirement of the process is uniform distribution of the foaming agent in the plastified resin. If such uniform distribution is not obtained, the extruded film will show undesirable irregularities in density and/or thickness. Another disadvantage of irregular distribution of foaming agent in the plastic resin is that it leads to so-called pressure-cycling in the extruder. Such cycling aggravates the irregular distribution of foaming agent and hence causes considerable difficulty in operation of the extruder.

Uniform distribution of liquid foaming agent in the plastic is facilitated, according to this invention, by operating the mixing zone at a high pressure and temperature; by continuously injecting foaming agent, at a pressure not substantially higher than that of the plastic, into a flowing plastic mass through a mixing device which assures immediate gross distribution of the liquid in portions of the plastic and thus prevents localized accumulation of unmixed foaming agent; and, in the preferred embodiment, by a novel arrangement of the mixing section of the extruder.

According to the preferred mode of this invention, excellent mixing, such as required in the production of foamed film and sheet by blow extrusion, is obtained in a relatively short mixing section which is operated at relatively high temperature and pressure, and which is characterized by a design which causes frequently repeated shearing of the two components of the mixture by alternation of sections in which strong transverse forces are applied and sections in which the transverse forces are low or moderate. Axially directed forces are not substantial in the mixing section. As illustrated in the drawing, the alternate subjection to strong and moderate tangentially directed or transverse forces is effected by passing the mass through a number of mixing elements provided with grooves, the mixing elements alternating with short, narrow annular flow sections. The mixing elements repeatedly divide the annular stream into a number of separate streams. As a result of the rotation of the extruder torpedo which contains the mixing elements, the portions of the mass passing through the grooves are exposed to strong tangential forces; in the annular flow sections the tangential forces are considerably less.

Regardless of any explanation for the effectiveness of the mixing action of the described mixing section, it has been found that use of such a mixing section in the process of this invention results in production of foamed film or sheet having a very uniform and desirably small cell size. It has also been found that the necessary uniform distribution of foaming agent in plastic is not obtained when the mixing elements in the mixing section are conventional so-called Dulmage stages. It appears therefore that the necessary mixing action is not primarily due to rotation of the plastic mass in the grooves of the mixing element, but to frequent recurrence of sudden turbulences and shears which occur at the entrance and exit of each mixing element.

In operating the process of this invention for the production of foamed polystyrene film, particulate polystyrene and a suitable foam nucleating agent, preferably in intimate admixture, are fed into the extruder via hopper 14.

In the feed section of the screw, the polystyrene is heated to about 150° to 300° C., and preferably to about 175° to 250° C. Part of the heating may be accomplished in the transistion and metering section. In zone A the pressure is raised to a value which is sufficient to overcome all the pressure drop downstream from the pumping section, and through the die. The pressure is thus raised to at least about 1,500 p.s.i., and preferably to a much higher value, in the range from 3,000 to 10,000 p.s.i. Pressures in this range result in improved mixing and consequently production of foam of improved uniformity and quality.

At the defined temperatures and pressures, the viscosity of polystyrene in the extruder is in the range suitable for satisfactory operation. Heating in zone A results in a uniformly homogeneous plastic mass having an apparent viscosity of less than 1 lb.$_F$-sec./sq. in. at an apparent shear rate of 10 reciprocal seconds. The relationships of viscosity and extruder operation are defined, for example, in Chapter 4 of "Processing of Thermoplastic Materials" and the conditions for satisfactory extruder operation can be accordingly controlled by the person skilled in this art.

At the point of injection of liquid foaming agent, the polymer is preferably at about the highest temperature and pressure attained in the extruder. The temperature in the first part, G, of the mixing zone is preferably maintained at a uniform, high value between about 150° and 300° C. most preferably between 175 degrees and 220 degrees C. by appropriate control of heating exchange means in said section; it may be as much as 40° less than the temperature at which the plastic enters the mixing section. Pressure in the mixing and cooling section, in a typical operation, is about 5,500 p.s.i. at the inlet, about 4,200 p.s.i. at the halfway point, and 2,000 p.s.i. just ahead of the die.

The pressure at which liquid foaming agent is injected into the extruder is preferably only slightly greater than that of the plastic passing the point of injection; the pressure differential needs to be only sufficient to assure that plastic does not enter the liquid injection orifice. The pressure differential may be as little as 15 p.s.i. and as high as 500 p.s.i. or more, but is preferably between 15 and 250 p.s.i. A pressure differential of about 50 p.s.i. is typical.

In zone H, the temperature of the mixture of plastic and foaming agent is reduced to a value between 100° and 160° C., and preferably between about 120° and 145° C. The die may itself be provided with heat exchange means, which may provide heating during start-up and cooling during continued operation.

From the die, the polymer is extruded into a zone which is at a substantially lower pressure than that prevailing in the extruder. Ordinarily it is extruded into space of atmospheric pressure. The resulting release of pressure on the polymer mass causes expansion of the liquid foaming agent, resulting in conversion of the extrudate to a spongy or cellular mass.

The above-defined temperatures are suitable for the extrusion of polystyrene. Some deviation from these temperatures can be made to obtain comparable flow in the extruder when resins other than polystyrene are extruded.

In a modification of the process, plastic, such as polystyrene, may be charged as a liquid. Suitably this may be the effluent of a polymerizer. In such an arrangement, the usual devolatilizing of freshly produced polymer may be omitted, e.g., when the monomer content of the polymer does not exceed 1.5%. When the plastic is introduced as liquid, most or all of plastifying section C of the screw can be omitted and the extruder shortened accordingly. In another modification, the extruder is modified so that liquid polymer is charged and devolatilized in the feed section.

Polystyrene in any desired form may be used as starting material in the process for this invention. It may have been produced by any of the known polymerization methods, e.g., bulk or mass polymerization, emulsion polymerization, or suspension polymerization. The feed may be in the form of powder, granules, nibs, beads or pellets, or it may be liquid, direct from the polymerization reactor if desired. Polystyrene compositions of high impact strength may be employed. These are compositions which contain a minor quantity of rubbery polymer, such as butadiene-styrene copolymer or polybutadiene. Such compositions are also produced by well known methods, e.g., by blending the rubbery polymer with polystyrene or by interpolymerizing a solution of rubbery polymer in styrene. The rubbery component may be cross-linked, if desired, during or after preparation of high-impact polystyrene. It may be in concentration from 1 to 20 phr.

The polystyrene starting material may also contain small amounts of a volatile expanding agent which are insufficient to yield a foamed product of the desired low density when this starting material as such would be converted into a foamed product by heating to a temperature which causes the volatile expanding agent to vaporize. Such materials can inter alia be expandable polystyrene beads or nibs which upon maturing at atmospheric pressures during transport or storage have lost the predominant part of their content of volatile expanding agent.

While the process of this invention is particularly designed for the production of foamed polystyrene product, it is also adaptable to the production of foamed product from other thermoplastic polymers which behave like polystyrene during extrusion. These comprise homopolymers of vinylaromatic compounds similar to styrene, and copolymers of styrene with vinylaromatic compounds and other olefinic compounds. Suitable vinylaromatic compounds comprise alpha-methylstyrene, ortho-, meta- and paramethylstyrene, meta- and paraethylstyrene, vinyl xylenes and corresponding halogenated compounds, e.g., orthochlorostyrene. Other suitable comonomers for styrene are methyl methacrylate, ethyl acrylate, methyl acrylate, vinyl chloride, vinyl acetate, and acrylonitrile. Other extrudable thermoplastic polymers are discussed, for example, in the above-referred to books.

Liquid foaming agents suitable for use in the process of this invention are preferably volatile aliphatic hydrocarbons or halohydrocarbons having atmospheric boiling points between about 10° and 100° C. Particularly preferred are n-pentane, isopentane, and n-butane. Suitable halomethanes include carbon tetrachloride, chlorofluoromethanes, -ethanes, -propanes and -butanes. Illustrative are monochlorotrifluoromethane, trichlorotrifluoroethane monochloroheptafluorocyclobutane and the like. Many of these compounds are well known and commercially available. Those of appropriate boiling point can be used. In general, suitable foaming agents are those volatile liquids, boiling in the defined range, which are non-reactive with the liquefied polymer. Illustrative of suitable types of compounds are those disclosed in U.S. Patents 2,816,827 and 2,848,428.

Generally, liquid foaming agent such as one of the above is added in an amount in the range from 2 to 10% by weight, based on polymer. The preferred range is from 5 to 6% by weight. Controlled variation of the concentration of foaming agent, other conditions being held essentially constant, results in controlled change in density of the expanded polymer product.

Production of foamed sheet of uniformly fine cell structure requires the addition of a foam nucleating agent. Preferred foam nucleation systems are combinations of an acid and a substance which liberates carbon dioxide when in admixture with the acid and polymer at the conditions prevailing in the extruder. The carbon dioxide-liberating compound is preferably a carbonate or bicarbonate of an alkali or alkaline earth metal. Typical carbon dioxide liberating compounds are sodium bicarbonate and potassium bicarbonate. Typical suitable acids are organic acids which have at least about 3 milliequivalents of acidic hydrogen per gram, such as malonic, citric, phthalic and fumaric acid. Citric acid is generally preferred. Useful combinations of this type are described in U.S. Patent 2,941,964 to Houston et al. Similar combinations in which boric acid is employed rather than an organic acid are described in U.S. Patent 2,941,965 to Ingram.

The foam nucleating compounds are generally used in total concentrations of from 0.2 to 2.0 phr. (parts per hundred parts resin), i.e., percent by weight, based on the resin. The combinations of carbon dioxide liberating compound and acid are most suitably used in concentrations which result in the liberation of from about 0.1 to 5 phr., and preferably from 0.1 to 1 phr., of carbon dioxide and water. A typical suitable system consists of 0.5 phr. sodium bicarbonate and 0.4 phr. citric acid.

Another useful group of foam nucleating agents are combinations of nitrogen liberating compounds with finely divided inorganic compounds.

Suitable nitrogen liberating compounds are organic compounds that decompose at temperatures between about 100° and 200° C., with evolution of nitrogen gas. Examples of suitable compounds of this type are azodicarbonamide, azodiisobutyronitrile, benzenesulfohydrazide, benzene m-disulfohydrazide, diphenylsulfone-3,3'-disulfohydrazide, 4,4' - oxybis(benzenesulfohydrazide), dinitrosopentamethylenetetramine, N,N'-dimethyl-N,N'-dinitrosoterephthalic amide, N,N'-diethyl-N,N'-dinitrosoterephthalic amide, N,N'-dimethyl-N,N'-dinitrosophthalic amide, and N,N'-ethylenedibenzamide.

The nitrogen liberating compounds are suitably employed in combination with finely divided solids, such as compounds of metals of Groups II, III or IV of the Periodic Table, and particularly their oxides. Calcium oxide is most preferred. Other oxides of alkaline earth metals are also suitable, as are those of zinc, magnesium, titanium and silicon. Silicates, such as calcium silicate, may also be employed. Other solid foam nucleating components are the inorganic pigments of U.S. Patent 3,072,581 to Platzer, and the hydrated salts of U.S. Patent 2,911,382 to Barkhuff et al.

The combined nitrogen liberating compound and inorganic metal compound are generally employed in total concentration between 0.2 and 2.0 phr., each of the components being present in an amount between 0.1 and 1 phr. The nitrogen liberating compound is preferably present in an amount between 0.2 and 0.6 phr., and the inorganic compound between 0.1 and 0.6 phr.

Preferred combinations of these compounds comprise 0.4 phr. of diphenylsulfone-3,3'-disulfohydrazide with 0.3 phr. of calcium oxide. Another preferred combination is one in which azodicarbonamide is used with calcium oxide in similar concentration.

Compared with the use of $CO_2$ liberating foam nucleating systems, the nitrogen liberating systems are particularly of advantage in the production of foamed products through dies of relatively wide slit width, e.g., of the order of 2 mm. To take advantage of these nucleating systems when extruding through relatively wide slits, the temperature of the die head is suitably held between 90° and 110° C. This permits production of relatively thick foamed sheets—e.g., 10 mm. thick in their unstretched state—with a uniform cell size of less than 0.4 mm., e.g., between 0.1 and 0.3 mm.

Other additives may be included in the polystyrene feed. For example, a small amount, such as 0.1–0.5 phr. of stearic acid or other saturated aliphatic carboxylic acid solid at room temperature may be added for further improvement in fineness of cell structure, and as lubricant. Hydrocarbon oils or waxes may be added as lubricants. Dyes and coloring pigments may be incorporated: The dye may be added in solution in the liquid foaming agent. Stabilizers may be added if desired.

The process of this invention is particularly suitable for the production of expanded polystyrene film or sheet in thicknesses in the range from 0.2 to 10 mm., having densities in the range from 50 to 500 g./l., and cell sizes typically in the range from 0.1 to 0.5 mm., the cells being substantially uniform in size.

It is characteristic of films or sheets of expanded polystyrene produced according to this invention that cell size is very uniform. Films of 1 mm. thickness or less are very flexible and only slightly brittle. They may be written on and can be used as paper substitutes. They have the advantage, i.e., that their wet strength is no less than their dry strength. Thicker sheets, of up to 5 mm. in thickness, can be conveniently molded into shaped articles such as dishes, beakers, and the like, e.g., by vacuum forming. Sheets of 2 to 10 mm. thickness are suitable for use as acoustic or thermal insulating material.

The invention is further illustrated by the following examples.

*Example 1*

Expanded polystyrene sheet is produced according to this invention, utilizing an extruder similar to that illustrated in the drawing. The extruder has a total $L/D$ ratio of 32 and a nominal screw diameter of 60 mm. The lengths of the several sections of the screw are as follows: C—15 D.; D—1 D.; E—5 D.; F—1 D.; G—5 D.; and H—5 D. The compression ratio, i.e., the ratio between channel depth in the feed section and the metering section, is 3:1. The channel depth at the blister is about 2 mm. The die is provided with an annular opening having a slit width of 0.75 mm. and a maximum diameter of 100 mm. The extruder is operated at 35 revolutions per minute.

In an illustrative operation a mixture of granules of polystyrene with 0.5 phr. of sodium carbonate and 0.4 p.h.r. of citric acid is fed into hopper 14. The temperature at the feed point is about 20° C. The mixture is heated to 220° C. in plasticizing zone A. Liquid pentane is injected into this mass continuously through line 15 at a ratio of 5 phr., at a pressure about 50 p.s.i. greater than that of the plastic mass. The temperature of the plastic mass at the pentane injection point is 200° C. In cooling zone the temperature of the plastic mass is lowered to about 140° C. The pressure of the plastic mass at the pentane injection point is 3,200 p.s.i.; halfway between the pentane injection point and the end of the mixing and cooling zone it is 2,180 p.s.i., and at the end thereof 1,170 p.s.i.

The mass issuing from the orifice of the die immediately expands to polystyrene foam, which is then blown up to film by means of air introduced through line 16. The ratio of expanded diameter to die diameter is 4:1 and the stretching ratio 2:1. At a production rate of 20 kg. per hour, the film has a thickness of 0.5 mm., a density of 120 g./l., and a very regular cell size of 0.1 to 0.2 mm. Foamed film of uniform quality is produced in this manner during 10 hours of continuous operation.

Repeating this run with equal molar proportions of n-butane and of monochlorotrifluoromethane, respectively, substituted for the pentane result in similar foamed product.

*Example 2*

In this example, expanded polystyrene sheet is produced by extrusion from an extruder similar to that illustrated in the drawing, having its screw divided into sections as follows: combined C and D—9½ D.; E—6½ D.; F—1 D.; combined G and H—15 D. The compression ratio is 3:1.

The pressure of the mass at the beginning of the mixing section, i.e., the point of pentane injection, is 3350 p.s.i. At distances 5 D., 10 D. and 15 D. from the point of pentane injection, the pressures, in p.s.i., are 2620, 1380 and 800, respectively.

Rate of pentane injection is 5.5 phr. The temperature of the extrudate leaving the die is 137° C. The remaining conditions are as in Example 1.

Expanded polystyrene film is produced at the rate of 20 kg. per hour. The foam quality has consistently good properties during a 10-hour run, remaining substantially constant at a foam density of 120 g./l., foam thickness of 0.5 mm., and uniform cell size of 0.2 mm.

*Example 3*

The extruder of Example 1 is modified by employing a die of 1 mm. slit and a maximum diameter of 100 mm. The extruder is operated at 14 r.p.m. At the point of pentane injection, the temperature is 210° C. and the pressure about 7300 p.s.i. The rate of pentane to polystyrene is 6 phr. The blow-up ratio of film of expanded polystyrene is 5:1 and the stretching ratio 3:1, the remaining conditions being as in Example 1.

Film, produced at the rate of about 9 kg. per hour, has a thickness of 0.8 mm., a density of 105 g./l., and a regular cell size in the range between 0.1 and 0.2 mm. Film of constant quality is produced throughout a ten-hour run.

*Example 4*

The effects of pressure in the mixing zone on the cell size of extruded polystyrene foam is observed in runs in which polystyrene foam is produced by blow extrusion according to Example 1, but at conditions at which the pressure in the mixing zone is controlled to different values. The foam nucleating agent employed in these runs is a mixture of 0.75 phr. of sodium bicarbonate and 0.5 phr. of citric acid. Density of the foamed but unstretched extrudate is in the range from about 40 to about 60 g./l. The observed relation of cell size and pressure in the mixing zone is illustrated in the following table:

| Mixing zone pressure, p.s.i. | Average cell size mm. |
|---|---|
| 3000–6000 | 0.4 |
| 5000–6500 | 0.3 |
| 6500–8000 | 0.2 |
| 8000–9500 | 0.1 |

*Example 5*

Expanded polystyrene sheet is produced according to this invention, utilizing an extruder of total 20 $L/D$ ratio, and arranged similarly to the drawing. The lengths of the several sections of the screw are as follows: C—5 D.; D—1 D.; E—5 D.; F—1 D.; following the sealing restriction there is an unflighted section of 1 D. in length, having the same screw diameter as metering section E and mixing section G. The foaming agent injection orifice is directly opposite the first mixing element 21. Section G is 3 D. in length, and contains six mixing elements 21, alternating with flow sections 22, each 0.25 D. in length. Section H is 4 D. in length, containing some mixing elements 23 of 0.9 D., alternating with flow section of 0.1 D.

General purpose polystyrene nibs, admix with nucleant as in Example 1, is charged to the extruder. The temperature in the feed section is about 225° C.; in the last part of the metering section 240° C.; and in the mixing zone G 230° C.; in cooling zone H the temperature is reduced to 125° C. and in the die to 120° C.

In a series of runs to observe the effect of ratio of foaming agent on product density, pentane is injected at ratios varying from 2.2 to 5.9 phr., by making appropriate adjustments in the stroke of the variable displacement pentane injection pump. The density of the unstretched foamed extrudate is found to vary as shown in the following table:

| Pentane concentration, phr. | Foam density, g./l. |
|---|---|
| 2.2 | 105 |
| 3.8 | 72 |
| 5.9 | 50 |

*Example 6*

Repeating Example 1 while introducing a mixture of polystyrene with 0.4 phr. of diphenylsulfone-3,3′-disulfohydrazide and 0.3 phr. of finely divided calcium oxide results in the product of satisfactory film having a slightly higher density, slightly larger cell size, and slightly lower thickness.

*Example 7*

In the extruder described in Example 5, comparative runs are made in which, in one case general purpose grade commercial polystyrene particles are charged, and in the second case particles of a commercial high impact grade, in which styrene-butadiene rubber is incorporated in the polymer. Conditions are maintained the same in both runs, except that the temperature in Section H, the cooling section, and the temperature of the extrudate, both are 5° C. lower when running high impact polymer, compared to the run with general purpose polymer.

Sheet of expanded polystyrene produced from high impact polymer is of about the same density as that from general purpose grade, has a larger cell size, about 0.5 mm., and appears more flexible.

We claim as our invention:

1. A process for producing expanded polystyrene, comprising
   (1) introducing polystyrene and foam nucleating agent into the first zone of a screw extruder which has a length-to-diameter ratio in the range from 20 to 36 and contains a single screw in a single cylinder, at least the last four diameter lengths of said first zone being the sole metering section of said extruder;
   (2) conveying said polystyrene forward in said first zone toward a second zone of said extruder by rotation of said screw, while heating and compressing the polystyrene to a temperature in the range from 150 to 300° C. and a pressure of at least about 1500 p.s.i.;
   (3) passing the resulting plastic mass into said second zone of said extruder, said second zone comprising in sequence a mixing xone and a cooling zone and terminating in an extrusion die;
   (4) injecting near the inlet of said second zone a continously flowing stream of volatile liquid foaming agent into said flowing plastic mass;
   (5) the pressure of the plastic mass throughout said second zone being no higher than the highest pressure in said extruder upstream from the point at which said foaming agent is injected;
   (6) intimately mixing said foaming agent and said plastic mass in said second zone at a temperature in the range from 150 to 300° C., said mixing comprising repeating at least four times the steps of dividing the forward-flowing plastic mass and admixed foaming agent into a multiplicity of segregated forward-flowing portions and recombining said segregated portions, whereby a mixture of substantially uniform composition is formed;
   (7) cooling the resulting mixture in said cooling zone to a temperature in the range from 100 to 160° C., and
   (8) extruding the cooled mixture through said die into a space at substantially lower pressure, whereby the extruded mass is expanded by virtue of the expansion of said foaming agent.

2. The process according to claim 1 wherein the pressure required for injecting said volatile liquid foaming agent is provided by positive displacement pumping means linked with said rotating screw such that the pumping rate varies in proportion to the rate of rotation of said screw.

3. A process for producing expanded polystyrene, comprising
   (1) introducing a mixture of polystyrene and foam-nucleating agent into the first zone of a screw extruder which has a length to diameter ratio in the range from 20 to 36 and contains a single screw in a single cylinder, said first zone being from 10 to 25 screw diameters in length, at least the last four diameter lengths thereof being the sole metering section of said extruder, said screw having constant pitch and root diameter in said metering section;
   (2) conveying said mixture forward in said first zone toward a second zone of said extruder by rotation of said screw while heating and compressing said mixture to a temperature in the range from 175 to 300° C. and a pressure in the range from 1,500 to 10,000 p.s.i.;
   (3) passing the resulting plastic mass into said second zone of said extruder, said second zone being at least 5 screw diameters in length and comprising, in sequence, a mixing zone and a cooling zone and terminating in an extrusion die;
   (4) injecting near the inlet of said second zone up to 10 phr. of a continuously flowing stream of volatile liquid foaming agent, at a pressure exceeding the pressure of the plastic mass by not more than about 500 p.s.i., into said flowing plastic mass;
   (5) the pressure of the plastic mass throughout said second zone being no higher than the highest pressure in said extruder upstream from the point at which said foaming agent is injected;
   (6) intimately mixing said foaming agent and said plastic mass in said second zone at a temperature in the range from 150 to 300° C., said mixing comprising advancing the mixture of plastic and foaming agent through a series of at least six mixing elements separated by annular flow sections which are from 0.2 to 2 times the length of the adjoining mixing elements, said mixing elements serving to divide the forward-flowing plastic mass and admixed foaming agent into a multiplicity of segregated forward-flowing portions subject to strong transverse forces which then are recombined in said annular flow sections, whereby a mixture of substantially uniform composition is formed;
   (7) cooling the resulting mixture in said cooling zone to a temperature in the range from 100 to 160° C., and
   (8) extruding the cooled mixture through said die into a space at substantially lower pressure, whereby the extruded mass is expanded by virtue of the expansion of said foaming agent.

4. The process according to claim 3 wherein said mixture passes from said first to said second zone of said extruder by way of an annular channel of reduced depth, defined by said cylinder and a unflighted section of said screw shaft having a diameter greater than the root diameter in said first and second zone.

5. The process according to claim 3 wherein said cooled mixture is extruded into the atmosphere through an annular blown film die while air is introduced into the resulting tube through the mandrel of said die.

6. The process according to claim 3 wherein said polystyrene contains from 1 to 20% of a rubbery polymer.

7. The process according to claim 3 wherein said foam nucleating agent is a carbon-dioxide liberating agent from the class consisting of the alkali and alkaline earth carbonates and bicarbonates together with a solid organic acid having at least about 3 milliequivalents of acidic hydrogen per gram, in amounts to produce upon reaction a total of from about one tenth to five phr. of water and carbon dioxide, and wherein said volatile liquid foaming agent is an aliphatic hydrocarbon boiling between 10 and 100° C.

8. The process according to claim 7 wherein said carbon dioxide liberating agent is sodium bicarbonate, said acid is citric acid, and said aliphatic hydrocarbon is pentane.

9. An extrusion apparatus comprising
   (1) a cylindrical chamber,
   (2) means for feeding a resin composition into the resin feed section of said chamber,
   (3) a die mounted at the discharge end of said chamber, (4) a screw mounted inside said chamber and adapted to transport resin from said feeding means to said die,
(5) means adapted to rotate said screw,
(6) said screw comprising in sequence,
  (a) a helicoidally flighted feeding, pumping and metering portion,
  (b) a mixing section,
  (c) a cooling section,
    said mixing and cooling sections having of themselves no forwarding capability,
(7) heat exchange means in the portion of the extruder surrounding said helicoidally flighted portion,
(8) separately controlled heat exchange means in that portion of the extruder surrounding said cooling section, and
(9) means adapted to introduce liquid of low viscosity into the extruder barrel near the inlet of said mixing section of the screw.

10. An extrusion apparatus comprising
(1) a cylindrical chamber,
(2) means for feeding a resin composition into the resin feed section of said chamber,
(3) a die mounted at the discharge end of said chamber,
(4) a screw mounted inside said chamber and adapted to transport resin from said feeding means to said die,
(5) means adapted to rotate said screw,
(6) said screw comprising, in sequence,
  (a) a feed section having a helicoidal flight and a deep channel, connecting with said resin feeding means,
  (b) a compression section, having a helicoidal flight and a channel depth transition providing a compression ratio from 2.5 to 4.5,
  (c) a single metering section, having a helicoidal flight,
  (d) a mixing section having of itself no mechanical forwarding capability and carrying at length intervals of from 0.05 to 0.3 cylinder diameters, in alternation at least four grooved crown sections of from 0.05 to 0.8 cylinder diameters in length,
  (e) a cooling section having of itself no mechanical forwarding capability and carrying further mixing elements,
(7) heat exchange means in the portion of the extruder surrounding said flighted screw sections,
(8) separately controlled heat exchange means in that portion of the extruder surrounding said mixing section,
(9) separately controlled heat exchange means in that portion of the extruder surrounding said cooling section, and
(10) means adapted to introduce liquid of low viscosity into the extruder barrel, near the inlet of said mixing section of the screw.

11. Apparatus according to claim 10 wherein said metering section has a helicoidal flight of constant helix angle and constant channel depth.

12. Apparatus according to claim 10 wherein said screw contains, between said metering section and mixing section, an unflighted section of the shaft having a diameter greater than the root diameter of the upstream and downstream parts of said screw.

References Cited

UNITED STATES PATENTS

| | | | |
|---|---|---|---|
| 2,453,088 | 11/1948 | Dulmage | 18—12 |
| 2,540,146 | 2/1951 | Stober | 264—40 XR |
| 2,542,459 | 2/1951 | Bannon | 264—349 XR |
| 2,736,058 | 2/1956 | Dellheim | 18—12 |
| 2,753,595 | 7/1956 | Dulmage | 18—12 |
| 2,787,809 | 4/1957 | Stastny | 260—2.5 XR |
| 2,810,159 | 10/1957 | Teichmann | 18—12 |
| 2,948,665 | 8/1960 | Rubens et al. | 18—12 |
| 2,983,692 | 5/1961 | D'Alelio | 260—2.5 |
| 2,987,774 | 6/1961 | Jacobson | 264—53 |
| 3,006,029 | 10/1961 | Saxton | 18—12 |
| 3,026,272 | 3/1962 | Rubens et al. | 264—53 XR |
| 3,026,273 | 3/1962 | Engles | 18—12 |
| 3,121,914 | 2/1964 | Olson et al. | 264—349 XR |
| 3,148,231 | 9/1964 | Spencer | 264—40 |
| 3,150,214 | 9/1964 | Scalora et al. | 264—53 |
| 3,151,192 | 9/1964 | Jacobs et al. | 264—53 |
| 3,160,688 | 12/1964 | Aykanian et al. | 264—53 |
| 3,174,185 | 3/1965 | Gerber | 18—12 |
| 3,287,477 | 11/1966 | Vesilind | 264—53 |

FOREIGN PATENTS

| | | |
|---|---|---|
| 1,206,810 | 2/1960 | France. |
| 854,586 | 11/1960 | Great Britain. |

OTHER REFERENCES

Collins, F. H.: "Controlled Density Polystyrene Foam Extrusion," in the SPE Journal, July 1960, pp. 705–709. Copy in 264–53.

ALEXANDER H. BRODMERKEL, *Primary Examiner.*
P. E. ANDERSON, *Assistant Examiner.*